(12) United States Patent
Michel

(10) Patent No.: US 9,371,880 B2
(45) Date of Patent: Jun. 21, 2016

(54) DUAL-TUBE SHOCK ABSORBER

(75) Inventor: Wilfried Michel, Riedenburg (DE)

(73) Assignee: AUDI AG, Ingolstadt (DE)

( * ) Notice: Subject to any disclaimer, the term of this patent is extended or adjusted under 35 U.S.C. 154(b) by 1778 days.

(21) Appl. No.: 12/172,009

(22) Filed: Jul. 11, 2008

(65) Prior Publication Data

US 2009/0014265 A1 Jan. 15, 2009

(30) Foreign Application Priority Data

Jul. 11, 2007 (DE) .......................... 10 2007 032314

(51) Int. Cl.
F16F 9/18 (2006.01)
(52) U.S. Cl.
CPC ..................... F16F 9/185 (2013.01)
(58) Field of Classification Search
CPC .......... F16F 9/185; F16F 9/06; B60G 17/044; B60G 17/08; B60G 15/12
USPC ........................................................ 188/315
See application file for complete search history.

(56) References Cited

U.S. PATENT DOCUMENTS

| | | | |
|---|---|---|---|
| 1,743,591 A | | 1/1930 | Blanchard |
| 3,272,495 A | * | 9/1966 | Axthammer ............... 267/64.16 |
| 4,139,182 A | * | 2/1979 | Nagase et al. ................ 267/120 |
| 4,647,026 A | * | 3/1987 | Siemann et al. ........... 267/64.15 |
| 4,673,068 A | * | 6/1987 | De Bruijn ..................... 188/315 |
| 4,823,922 A | * | 4/1989 | Ergun .......................... 188/282.8 |
| 6,253,888 B1 | * | 7/2001 | Bell et al. ...................... 188/275 |

FOREIGN PATENT DOCUMENTS

| | | |
|---|---|---|
| DE | 567589 C | 1/1933 |
| DE | 733116 C | 3/1943 |
| DE | 1141841 B | 2/1961 |
| DE | 1904958 | 2/1969 |
| DE | 2257556 A | 11/1972 |
| DE | 2524971 A1 | 12/1976 |
| DE | 10 2004 032 472 a1 | 2/2006 |
| FR | 11277264 | 1/1961 |

OTHER PUBLICATIONS

Kausemann, Peter. Kraftfahrzeugstoßdampfer Bibliothek der Technik, Bd. 185. Verlag moderne Industrie, Landsberg, 1999.

* cited by examiner

*Primary Examiner* — Xuan Lan Nguyen
(74) *Attorney, Agent, or Firm* — Maier & Maier, PLLC

(57) ABSTRACT

A shock absorber for a motor vehicle including an outer cylinder having upper and lower end walls, an inner cylinder disposed within and coaxially relative to the outer cylinder, connected to the upper end wall of the outer cylinder, providing an annular chamber with the outer cylinder and having a partition wall at a lower end thereof spaced from the lower end wall of the outer cylinder, and a piston having a head portion disposed in the inner cylinder and a rod portion extending through the partition wall of the inner cylinder and the lower end wall of the outer cylinder, wherein the annular chamber is filled with a gas, the inner cylinder is filled with a damping fluid and the piston head and the end wall of the inner cylinder are provided with one-way valves.

1 Claim, 4 Drawing Sheets

DUAL-TUBE SHOCK ABSORBER

The invention relates to a dual-tube shock absorber, in particular for a motor vehicle.

BACKGROUND OF THE INVENTION

Dual-tube shock absorbers such as these are relatively well known in the prior art, cf. DE 10 2004 032 472 A1 and DE 2 257 556.

As is generally known, in dual-tube shock absorbers the working cylinder and the container tube form two chambers: The working chamber within the working cylinder in which the piston and the piston rod move, and the annular oil storage space between the working cylinder and the container tube which is used to equalize the changes in oil volume caused by the motion of the piston rod in the working chamber. The oil storage space is in one part filled with mineral oil and in the other with air which is under a pressure of six to eight bar. As the piston rod is retracted and extended, the gas pressure in the oil storage space is increased and reduced according to the exchanged oil volume. Two damping valves are used for damping: The piston valve and the bottom valve. When the vehicle rebounds, the piston valve alone assumes damping. The valve opposes resistance to the oil flowing down out of the space above the piston. The upward motion of the piston is braked. By way of an open nonreturn valve in the bottom valve, the oil, which is required in the working chamber, can flow unobstructed out of the storage space. When the vehicle suspension is compressed, the damping of the bottom valve is determined for one part also by the flow resistances of the piston in the compression direction. The oil which has been displaced by the retracting piston rod flows into the storage space. The bottom valve opposes resistance to this flow and thus brakes the motion, see "*Die Bibliothek der Technik*" [Library of Engineering], Vol. 185, Motor Vehicle Shock Absorbers, Peter Causemann, Verlag. Moderne Industrie, pp. 19/20.

In this connection the circumstance is especially disadvantageous that the known dual-tube shock absorbers as a result of the oscillating container tube have a relatively large unsprung mass. To simply "upend" a dual-tube shock absorber known from the prior art in order to avoid the aforementioned disadvantage is not technically possible, since in this case the bottom valve would no longer lie below the oil level, i.e., the upended dual-tube shock absorber would no longer be serviceable. Consequently, with the known dual-tube shock absorber technical implementation is not possible either, if, for example, there is the requirement, functionally or in terms of a package, that the container tube should be at relative rest and the piston rod oscillate.

The object of the invention is to develop a dual-tube shock absorber according to the type given in the preamble of claim 1 while avoiding the indicated disadvantages, such that the dual-tube shock absorber has lower unsprung masses.

SUMMARY OF THE INVENTION

Analogous to the dual-tube shock absorbers known from the prior art, the dual-tube shock absorber according to the invention has a working cylinder filled with a damping fluid and a container tube which concentrically encloses the working cylinder. Between the working cylinder and the container tube a storage space filled with damping fluid and a gas is formed. The working cylinder is sealed relative to the storage space by means of a bottom plate. By way of at least one bottom valve which is provided in the bottom plate the working cylinder is dynamically connected to the storage space. Moreover, the dual-tube shock absorber in the conventional manner has a piston which divides the working cylinder into two working chambers, with at least one piston valve. The piston rod of the piston is guided via a piston rod guide which is located on the piston rod outlet-side end of the dual-tube shock absorber. According to the invention, it is provided that the piston rod, viewed in the axial direction or in the installation position, is located underneath the dual-tube shock absorber. For this purpose, the bottom plate has an opening through which the piston rod is guided liquid-tight and, viewed in the axial direction, the piston rod guide and the piston rod outlet-side end of the dual-tube shock absorber are located underneath the bottom plate.

As a result of the measures according to the invention, for the first time a dual-tube shock absorber is made available for which the piston rod, viewed in the axial direction or in the installation position, is located underneath the actual shock absorber body. The major advantage of this arrangement consists in that now the shock absorber body which has a large mass relative to the piston rod, that is to say, the working cylinder and the container tube, are at relative rest and only the piston rod oscillates. Thus, compared to known shock absorbers, the dual-tube shock absorber according to the invention has lower unsprung masses. The measures according to the invention moreover ensure that the bottom plate and the bottom valve are below the oil level, that is, full serviceability of the dual-tube shock absorber is ensured.

With the dual-tube shock absorber according to the invention, it is now also possible to technically implement the requirement dictated by the package or function that the container tube is to be at relative rest and only the piston rod is to oscillate. Consequently, the container tube which is at rest can also be advantageously used as a support element for another machine element.

By preference the opening in the bottom plate has an annular groove. Thus, a possibility for a space-saving arrangement of a seal is advantageously made available to enable liquid-tight routing of the piston rod through the bottom plate.

Other advantages, features, and potential applications of this invention will become apparent from the following description in conjunction with the embodiment shown in the drawings.

BRIEF DESCRIPTION OF THE DRAWINGS

The terms and assigned reference numbers used in the list of reference numbers cited below are used in the specification, in the claims, in the abstract, and in the drawings:

DETAILED DESCRIPTION OF THE PREFERRED EMBODIMENT OF THE INVENTION

Figure 1:
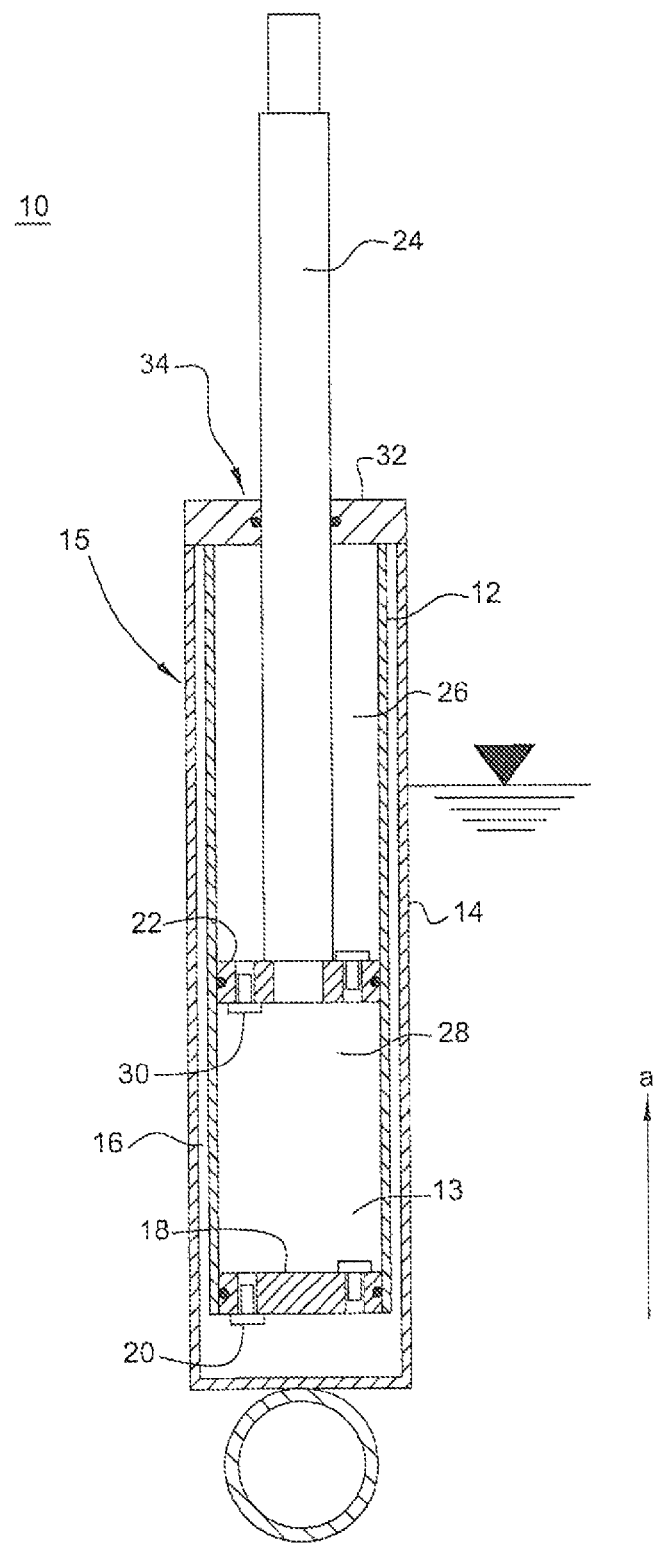
FIG. 1 shows a schematic of a dual-tube shock absorber according to the prior art.

FIG. 1 shows more or less schematically a dual-tube shock absorber, according to the prior art that is designated as a whole with reference number 10.

The dual-tube shock absorber 10 comprises a working cylinder 1' which is filled with a damping fluid 13. The working cylinder 12 is concentrically surrounded by a container tube 14. Between the working cylinder 12 and the container tube 14 a storage space 16 is formed which is filled with damping fluid 13 and with a pressurized gas 15, such as, for example, air. The working cylinder 12 is sealed relative to the storage space 16 via a bottom plate 18. The bottom plate 18 has two bottom valves 20 via which the working cylinder 12 is dynamically connected to the storage space 16. Moreover, in the working cylinder 12 a piston 22 is guided which is connected to the piston rod 24 and which divides the working cylinder 12 into two working chambers 26, 28. The piston 22 for its part has two piston valves 30 via which the two working chambers 26, 28 of the working cylinder 12 are dynamically connected. The piston rod 24 is guided in the piston rod guide 32. The piston rod guide 32 viewed in the axial direction (a) or in the installation position is located at the top, i.e., the piston rod outlet-side end 34 of the dual-tube shock absorber is likewise located at the top.

In the dual-tube shock absorber 10 according to the prior art, the circumstance that it has relatively large unsprung masses is disadvantageous.

Figure 2:
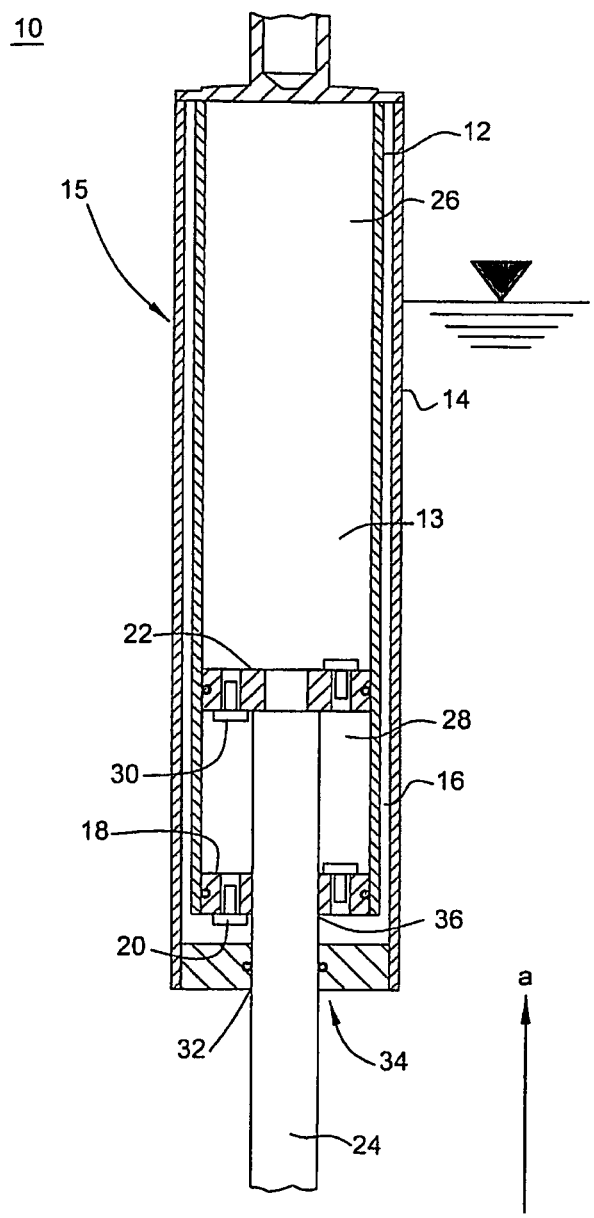
FIG. 2 shows a schematic of a dual-tube shock absorber according to the invention.

The dual-tube shock absorber 10 according to the invention which is shown in FIG. 2 avoids the aforementioned disadvantages of the prior art.

In contrast to the known dual-tube shock absorber 10, the bottom plate 18 has an opening 36 through which the piston rod 24 is guided liquid-tight. Thus, viewed in the axial direction (a) or in the installation position, the piston rod guide 32 and the piston rod outlet-side end 34 of the dual-tube shock absorber 10 are located underneath the bottom plate 18. I.e., for the dual-tube shock absorber 10 according to the invention, the piston rod 24 in the installation position is underneath the actual shock absorber body 12, 14.

This ensures that the dual-tube shock absorber 10 according to the invention, compared to the known shock absorbers, has lower unsprung masses, since essentially only the piston rod acts as an unsprung mass due to the now enabled "upended" installation, specifically the piston rod 24 underneath the actual shock absorber body 12, 14.

Since the container tube 14 is at rest, it can now also be used as a bearing surface or support element for another machine element.

The method of operation of the dual-tube shock absorber 10 according to the invention corresponds to that of a conventional dual-tube shock absorber.

Figure 3:
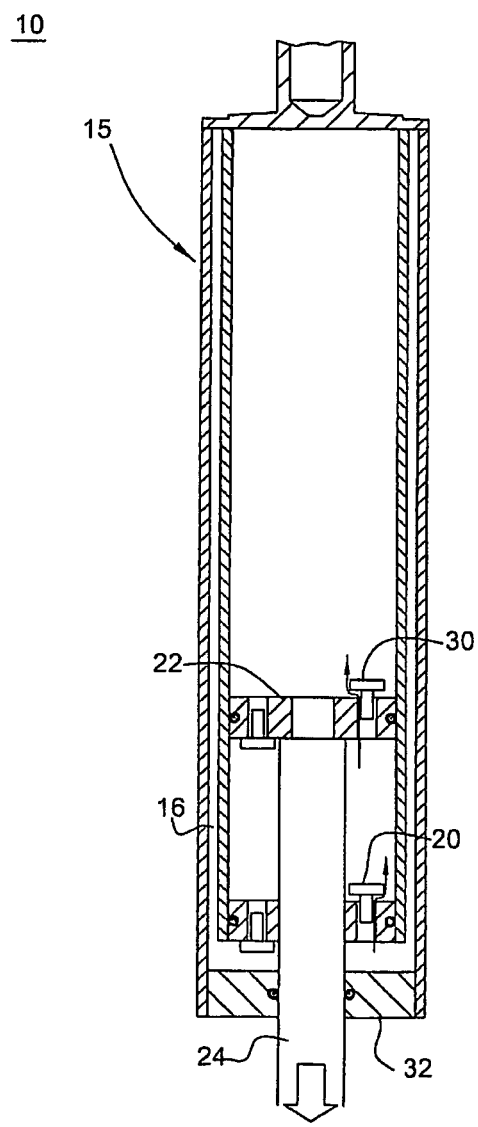
FIG. 3 shows a dual-tube shock absorber as shown in FIG. 2 in the tension stage.

In the tension stage, cf. FIG. 3, throttling takes place via the piston valve 30 and replenishment takes place by way of the bottom valve 20, i.e., the volume of the piston rod which is being extended from the working chamber 26 is replenished.

Figure 4:
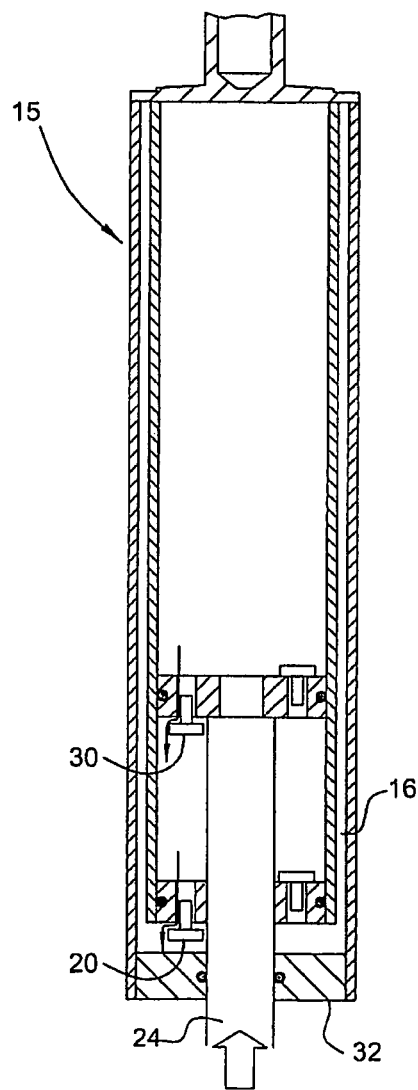
FIG. 4 shows the dual-tube shock absorber as shown in FIG. 2 in die compression stage.

In the compression stage, cf. FIG. 4, throttling takes place by way of the piston valve 30 and extension takes place by way of the bottom valve 20, i.e., the volume of the piston rod which is being retracted into the working chamber 26 is pushed into the storage space 16.

The invention claimed is:

1. A shock absorber for a motor vehicle comprising:
an outer cylinder having upper and lower end walls;
an inner cylinder disposed within and coaxially relative to said outer cylinder, connected directly to and closed at an upper end thereof by said upper end wall of said outer cylinder, spaced from said lower end wall of said outer cylinder and having a partition wall closing a lower end thereof, spaced from said lower end wall of said outer cylinder and having a pair of restricted passageways therethrough, each providing flow in only one direction opposite the direction of flow of the other of said restricted passageways, providing a working chamber therein, an annular chamber disposed between said inner and outer cylinders and a lower chamber disposed between said partition wall of said inner cylinder and said lower end wall of said outer cylinder, communicating with said annular chamber;
a gas disposed in a closed end of said annular chamber;
a damping fluid disposed in said working chamber, said lower chamber and a lower end of said annular chamber; and
a piston having a head portion disposed in and axially displaceable within said working chamber provided with a pair of restricted passageways, each providing flow in only one direction opposite the direction of flow of the other of said restricted passageways intercommunicating upper and lower portions of said working chamber, and a rod portion extending through axially aligned openings in said partition and lower end walls of said outer cylinder.

* * * * *